Jan. 8, 1952 — C. F. BACHLE — 2,581,996
ENGINE COOLING SYSTEM
Filed Dec. 13, 1947 — 3 Sheets-Sheet 2
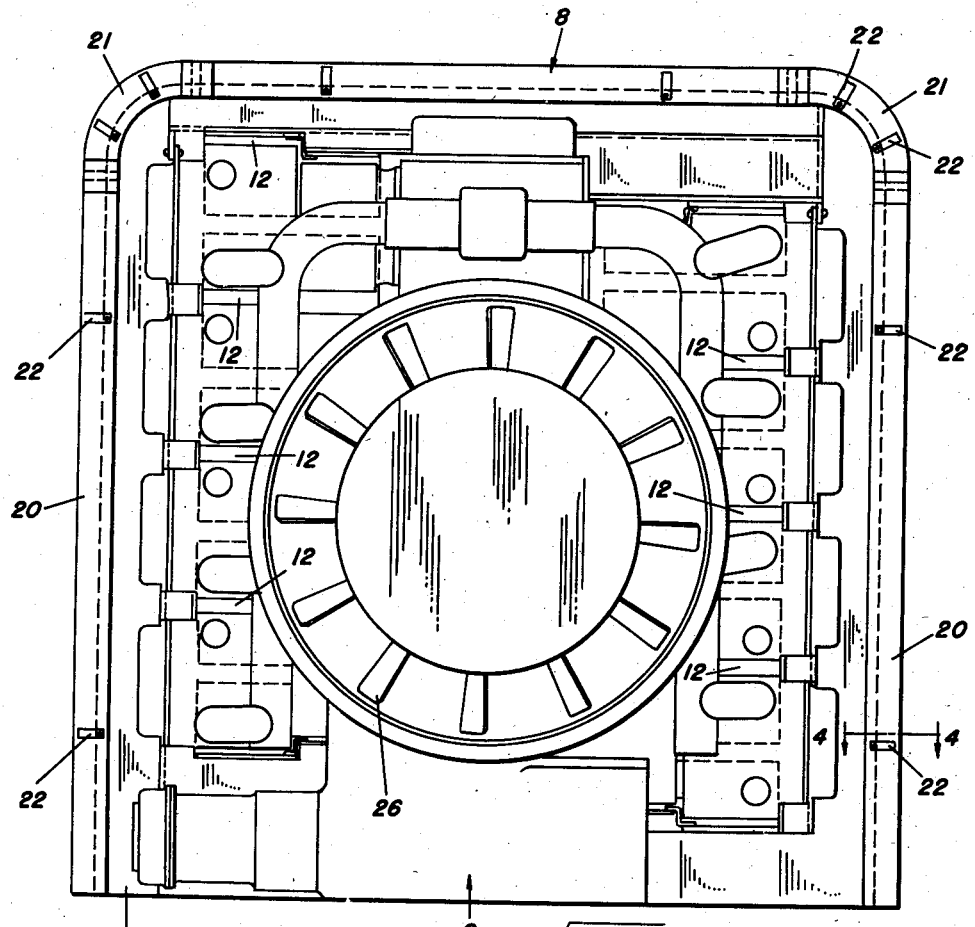
FIG_2
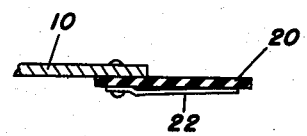
FIG_4
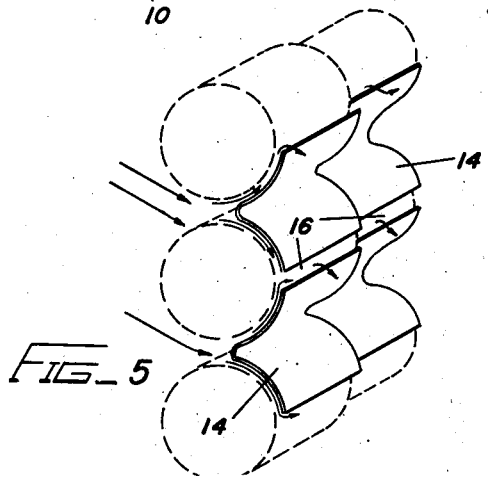
FIG_5
INVENTOR.
CARL F. BACHLE
BY
Hauke, Hardesty & Schmidt
ATTORNEYS.

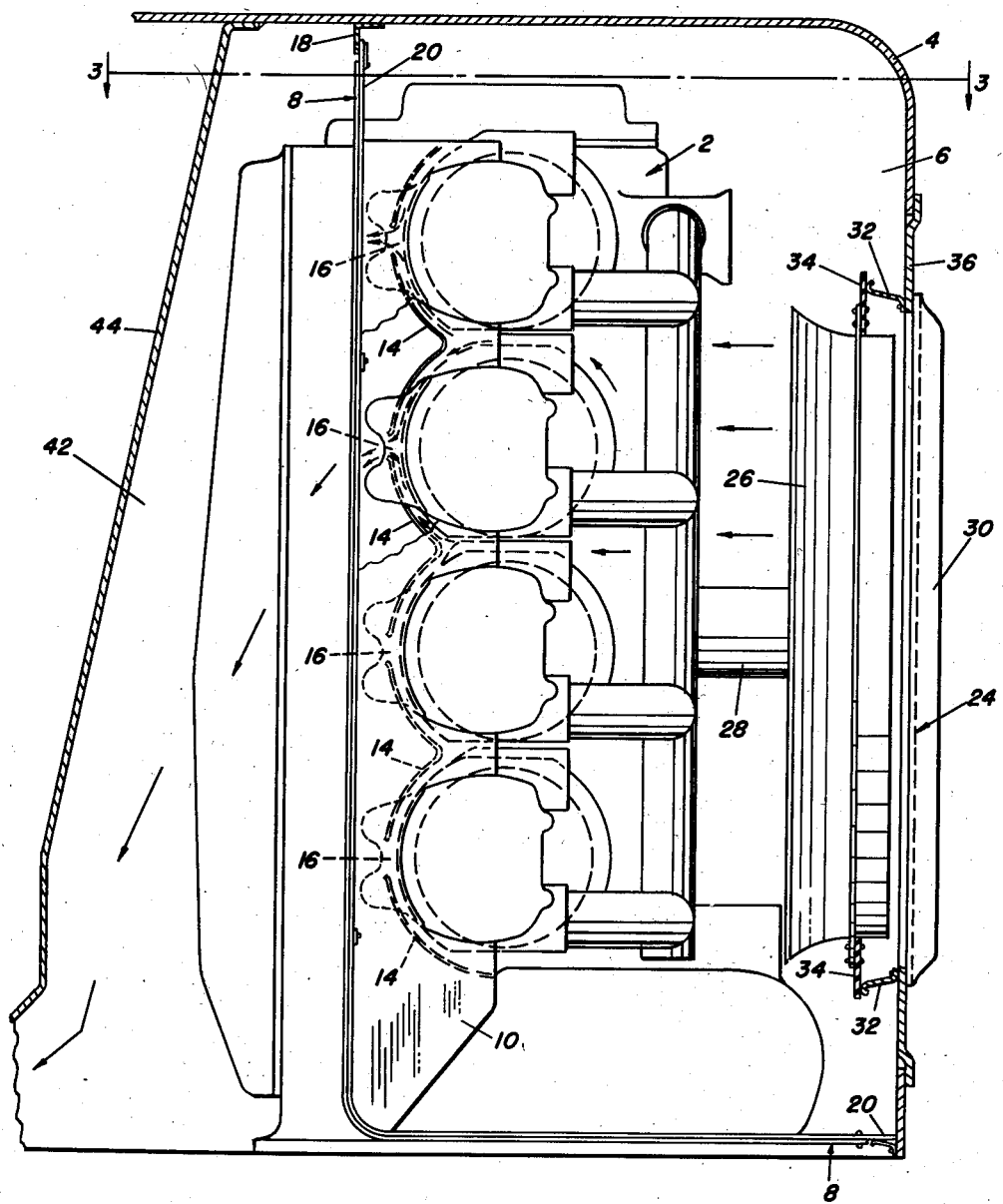
FIG_1
INVENTOR.
CARL F. BACHLE

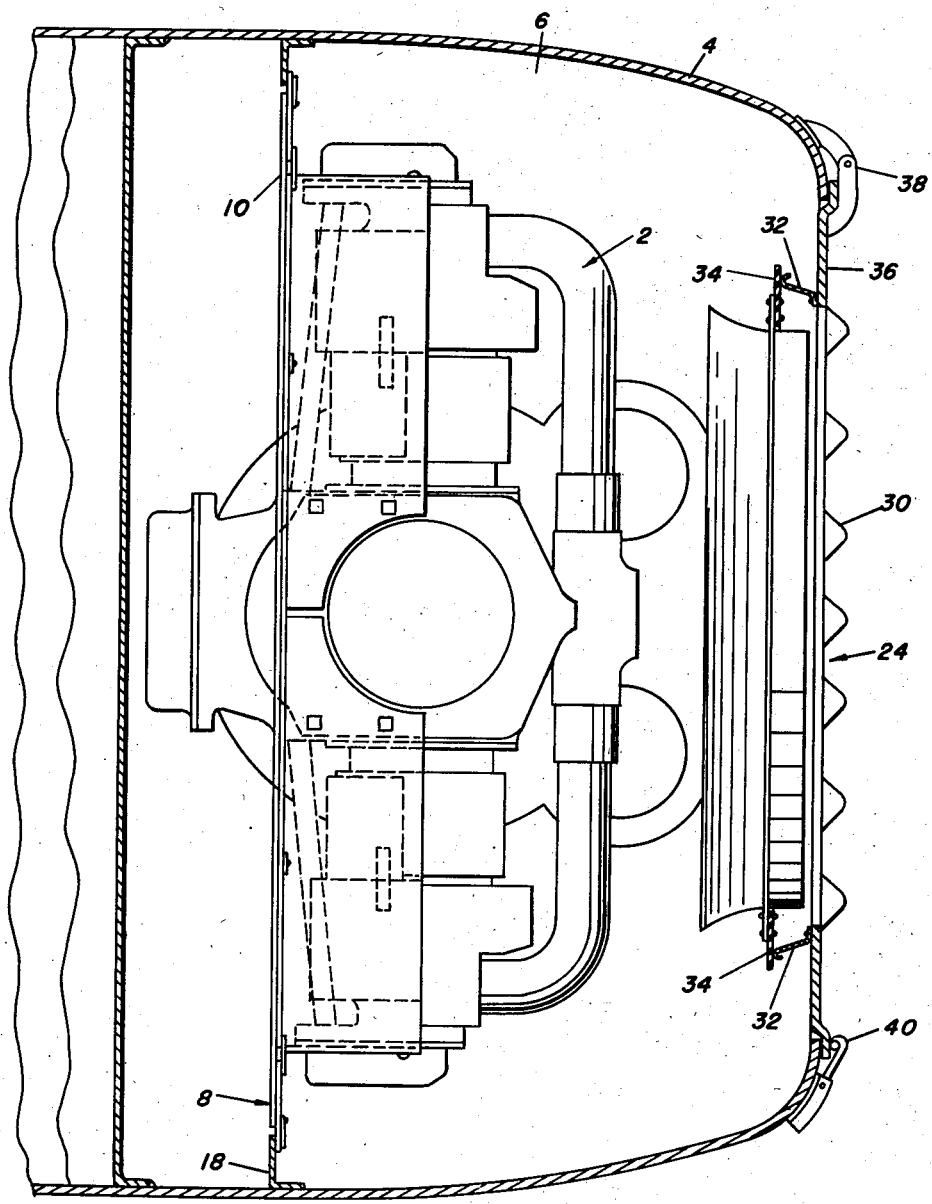

Patented Jan. 8, 1952

2,581,996

UNITED STATES PATENT OFFICE 2,581,996

ENGINE COOLING SYSTEM

Carl F. Bachle, Grosse Pointe, Mich., assignor to Continental Motors Corporation, Muskegon, Mich., a corporation of Virginia Application December 13, 1947, Serial No. 791,639

3 Claims. (Cl. 123—41.61)

This invention relates to a cooling system for internal combustion engines, especially to a cooling system and method of installation for an air-cooled piston engine mounted in an automotive vehicle.

The automotive vehicle itself is not shown here, but is shown and claimed in copending patent application Serial Number 759,985, filed July 10, 1947, and assigned to the assignee of this invention.

In the design of automotive vehicles of the truck type, it is desirable to conserve length of the vehicle and to provide a maximum of accessibility to the engine in order to facilitate servicing. The present invention does this by mounting the engine with the crankshaft standing vertical rather than horizontal as in a conventional engine. The accessibility of the engine is further facilitated by arranging for the vehicle itself to form the duct work between the cooling fan and the cylinders, as opposed to the more conventional method of having sheet metal ducts as part of the engine. By this method a large plenum chamber is pressurized with the result that all cylinders have equal flow of air without interference from locally high velocities.

It is an object of this invention to provide a system for the efficient air cooling of an internal combustion engine, in a space-saving design. This and other objects are accomplished in an internal combustion engine which is placed in, or partially in, a pressurized chamber. Air is forced into the chamber by a fan driven by the engine, and leaves the chamber through outlets which are so arranged that the air must come into close contact with the cooling fins in order to pass out of the pressurized chamber.

In the drawings:

Fig. 1 is a partial sectional view showing the engine in side elevation.

Fig. 2 is a front elevation of the engine and a partition which helps to form the pressurized chamber.

Fig. 3 is a view in section on line 3—3 of Fig. 1.

Fig. 4 is a view in section on line 4—4 of Fig. 2, and

Fig. 5 is a perspective view showing two inter-cylinder baffles in place on engine cylinders, the cylinders being shown in phantom.

Referring now in detail to the drawings, an internal combustion engine 2 is shown inside a housing formed in part by an automotive vehicle hood 4. The engine 2 may be mounted in the vehicle in any suitable manner, for example as shown in the above identified copending patent application.

The engine is largely mounted in a pressurized chamber 6. The chamber 6 is formed partly by the hood 4 and partly by the partition 8. The partition 8 consists of a membrane 10 which is preferably sheet metal, and which is formed so as to fit between adjacent cylinders, and between the engine and the hood, in such a way as to substantially prevent the flow of air from front to back of the pressurized chamber except as permitted by openings 12 between adjacent cylinders, and between end cylinders and the partition.

Air which passes through the openings 12 is maintained in intimate contact with the cooling fins by baffles 14, commonly known as inter-cylinder baffles. The baffles 14 are preferably placed tight against the cooling fins in order to assure that the air circulating past the cylinders will have a maximum of contact with the fins (details such as cooling fins are not shown in the drawings).

Adjacent inter-cylinder baffles are spaced apart to provide air outlets 16. See especially Figs. 1 and 5.

A seal is provided between the perimeter of the membrane 10 and the walls of hood 4. This seal consists of a ledge 18 and a strip of resilient material 20. The ledge 18 is preferably secured inside the hood 4 and extends inward to have rubbing contact with the resilient material 20 which is preferably secured to the membrane 10. For ease of manufacturing, the resilient strip 20 may be spliced at the corners 21 by a small piece of over-lapping curved strip of material of the same substance as material 20. A plurality of spring fingers 22 are provided as shown in detail in Fig. 4 to hold the resilient material 20 in engagement with the ledge 18.

One face of hood 4 is provided with an air passage 24 through which cooling air is drawn from the outside. A fan 26 is rotatably disposed in the air passage 24 and is connected by means of a shaft 28 to be driven by the engine 2. The air passage 24 is provided with any suitable grill 30 to protect the fan against injury. The edges of the opening air passage are sealed against leakage of air by means of a flexible strip 32, which is preferably sheet metal, bearing against the resilient strip 34 which is preferably of the same material as the material 20. Resilient strip 34 is mounted on the outside of the fan blade housing.

The entire inlet air passage 24 is mounted in a door 36 which is hinged as shown at 38 to provide easy access to the pressurized chamber. The door 36 may be held closed by any suitable latch mechanism 40. As door 36 opens, the flexible strip 32 moves away from the resilient strip 34.

Behind the vertical portion of the partition 8, there is provided a chamber 42 bounded at the rear by a wall 44 which extends downward from the top of hood 4 as shown in Fig. 1. The chamber 42 is open at the bottom to permit air to pass downward and out away from the engine.

Operation

In operation, air is drawn through the grill 30 into the pressurized chamber 6. The fingers 22 at all times keep the resilient material 20 in contact with the ledge 18, so that when pressure builds up in chamber 6, the pressure will hold the resilient strip 20 in tight contact with the ledge 18. Air is forced through the openings 12 and passes between the inter-cylinder baffles 14 and the cylinder walls, coming into intimate thermal contact with the cooling fins. The air that is thus heated then passes to the rear through openings 16 into the chamber 42, whence it passes downward and out.

There will be a limited amount of movement of the engine 2 relatively to the housing or hood 4. This movement can be accommodated by the rubbing contact that the resilient material 20 has with the ledge 18, and which the resilient strip 34 has with the flexible strip 32.

In general the pressurized chamber 6 is of an area exceeding four to ten times the total area of the outlets 16, so that any velocity imparted to the air on being forced into said chamber is ineffective in causing air flow around the engine cylinders. Thus, passage of the cooling medium, such as air, into heat transfer relation to the cylinders, is induced solely by the pressure differential existing between chambers 6 and 42, and uniform flow of air is had through all outlets. In actual practice, it is thus possible to take off air from the pressurized chamber for circulation through an oil cooler or for cooling other engine accessories as desired.

I claim:

1. In an engine powered automotive vehicle comprising a vehicle structure and an air cooled multi-cylinder internal combustion engine supported thereby, said vehicle structure provided with a pressurized compartment having a rear wall, said engine being mounted, in said compartment forwardly of said rear wall, a blower for flowing cooling air into said compartment, said compartment rear wall having outlets and air flow baffles coacting with the outlets to direct air to flow in heat transfer relation with respect to all said engine cylinders, and said compartment having a cross-sectional air flow area exceeding four times the area of all said outlets to provide for substantial uniform static air pressure adjacent to all said cylinders.

2. In an engine powered automotive vehicle comprising a vehicle structure and an air cooled multi-cylinder internal combustion engine supported thereby, said vehicle structure provided with a pressurized compartment having a rear wall, said engine being mounted in said compartment forwardly of said rear wall, a blower for flowing cooling air into said compartment, said compartment rear wall having outlets and air flow baffles adjacent to and coacting with the outlets to direct air to flow in heat transfer relation with respect to all said engine cylinders, and said compartment bounded by a hood structure and said rear wall which is secured to the engine and to said hood structure, whereby to provide a pressurized compartment having a cross-sectional air flow area exceeding four times the area of said outlets to provide for substantial uniform static air pressure adjacent to all said cylinders.

3. In an engine powered automotive vehicle comprising a vehicle structure and an air cooled multi-cylinder internal combustion engine supported thereby, said vehicle structure provided with a pressurized compartment having a rear wall, said engine being mounted in said compartment forwardly of said rear wall, a blower for flowing cooling air into said compartment, said compartment rear wall having outlets and air flow baffles adjacent to and coacting with the outlets to direct air to flow in heat transfer relation with respect to all said engine cylinders, and said compartment bounded by a hood structure and said rear wall which is secured to the engine and to said hood structure, whereby to provide a pressurized compartment having a cross-sectional air flow area exceeding four times the area of said outlets to provide for substantial uniform air pressure adjacent to all said cylinders, said engine mounted on end in said compartment with its cylinders extending normal to the vertical longitudinal vehicle plane and parallel to said rear wall of said pressurized compartment, and a baffle to the rear of said rear wall to deflect the air exhausted from said pressurized compartment to atmosphere generally downwardly and rearwardly of said engine.

CARL F. BACHLE.

REFERENCES CITED

The following references are of record in the file of this patent:

UNITED STATES PATENTS

| Number | Name | Date |
| --- | --- | --- |
| 1,664,414 | Heron | Apr. 3, 1928 |
| 1,712,622 | Kruckenberg et al. | May 14, 1929 |
| 2,061,171 | Ryder | Nov. 17, 1936 |
| 2,152,043 | Gregory | Mar. 28, 1939 |
| 2,173,896 | Caldwell | Sept. 26, 1939 |

FOREIGN PATENTS

| Number | Country | Date |
| --- | --- | --- |
| 857,608 | France | Apr. 22, 1940 |

OTHER REFERENCES

The Cowling and Cooling of Radial Air-Cooled Aircraft Engines SAE Journal, May 1934 (pages 147–165).